Aug. 30, 1960 P. HEIMLICHER ET AL 2,950,805
ARTICLE CONVEYING AND TRANSFERRING MEANS
Filed Nov. 15, 1954 4 Sheets-Sheet 1
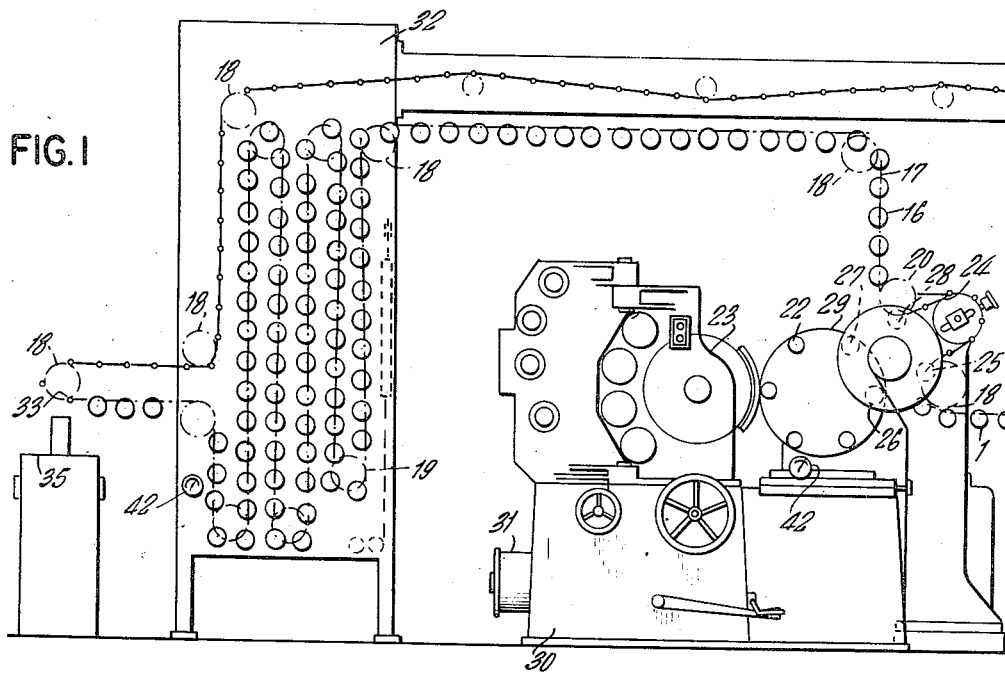
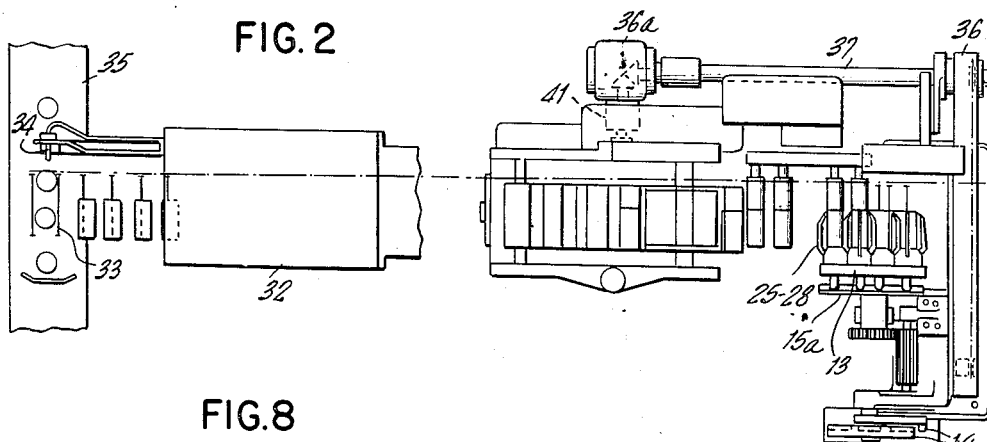
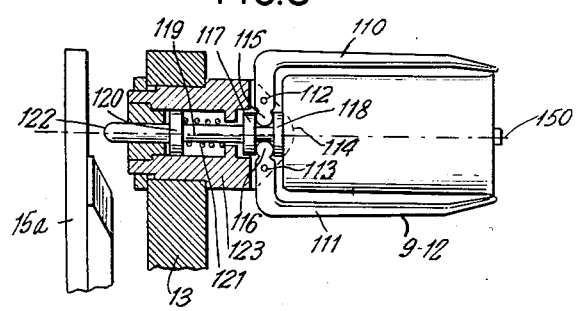
INVENTORS
PAUL HEIMLICHER
FRIEDRICH MEIERHOFER
BY
Leon M. Strauss
AGT.

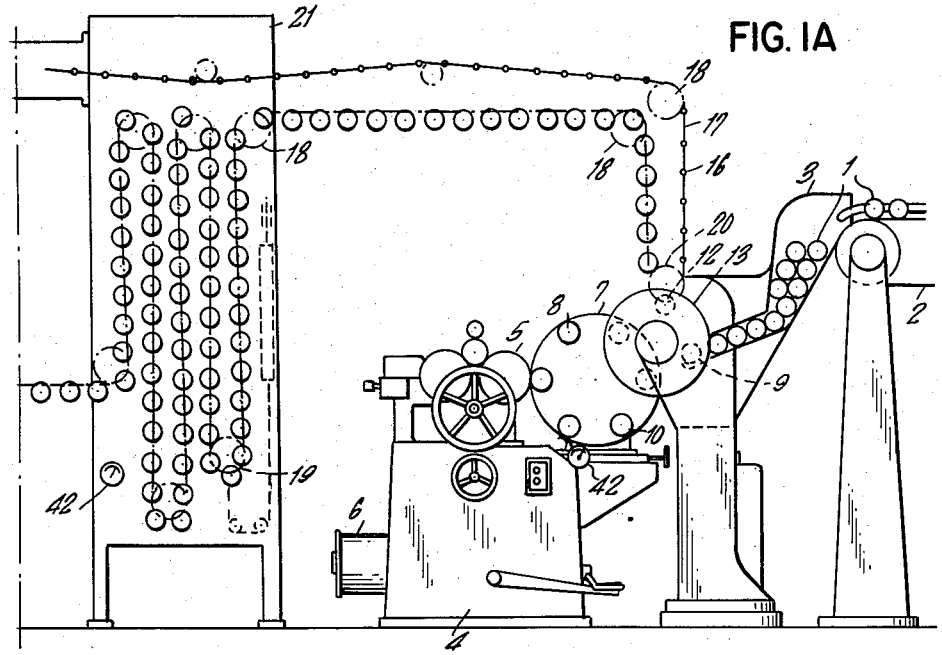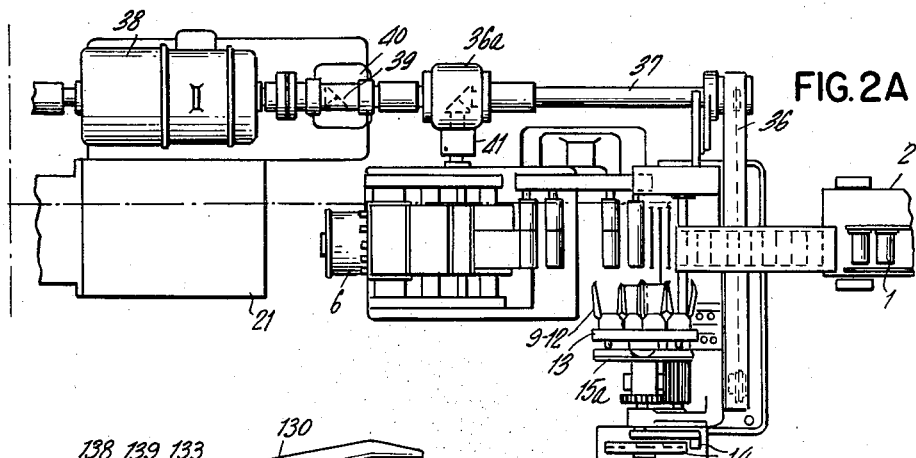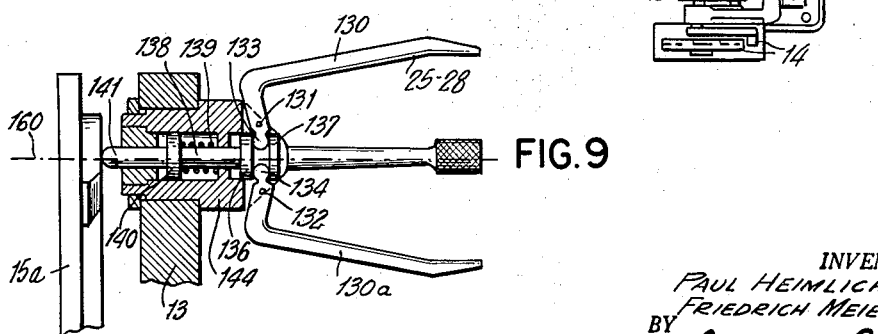

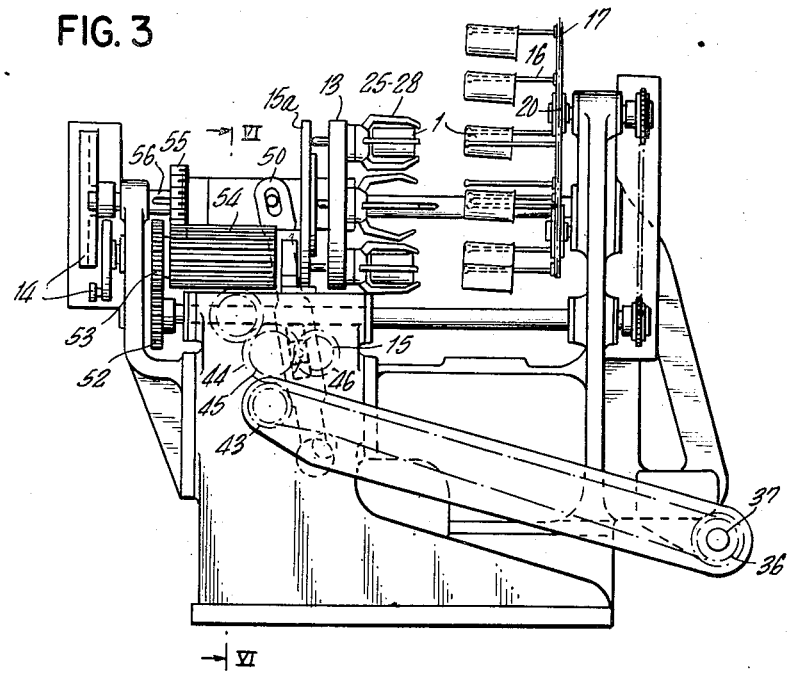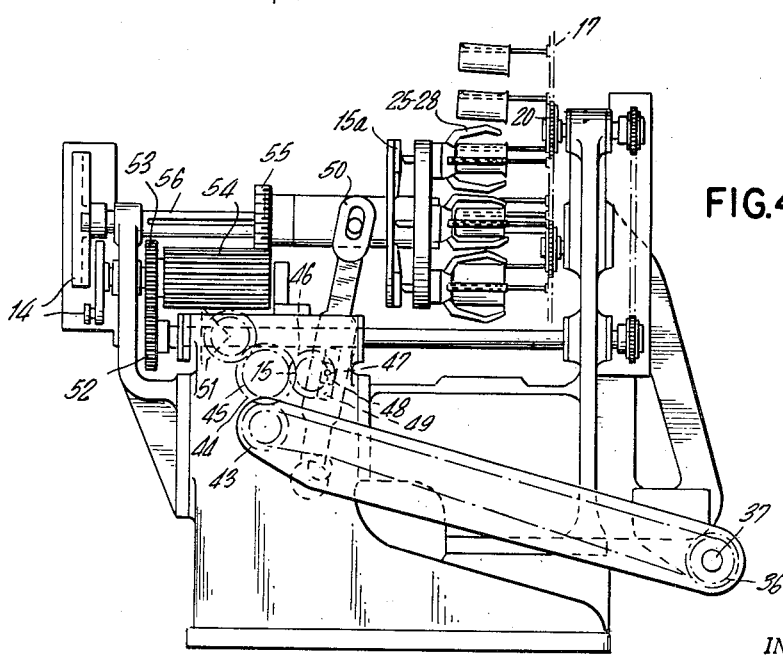

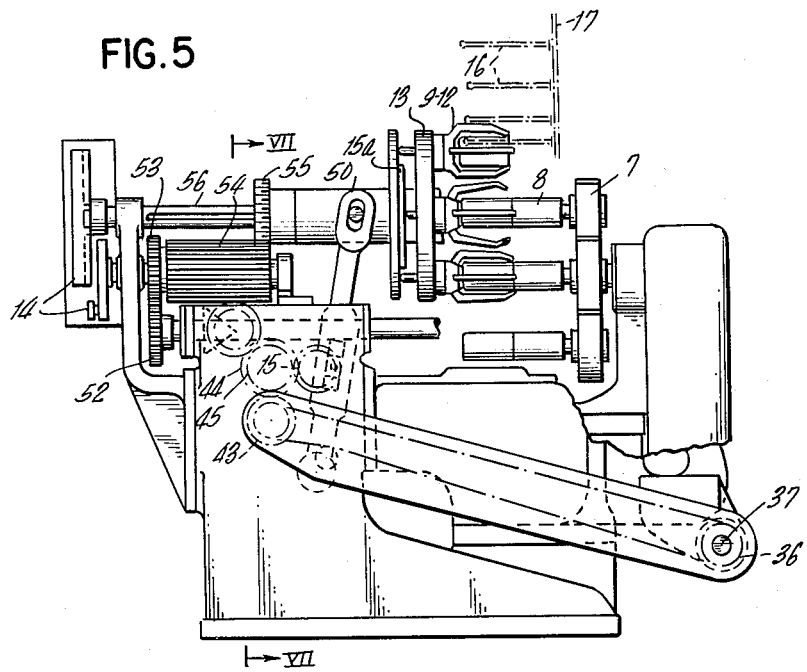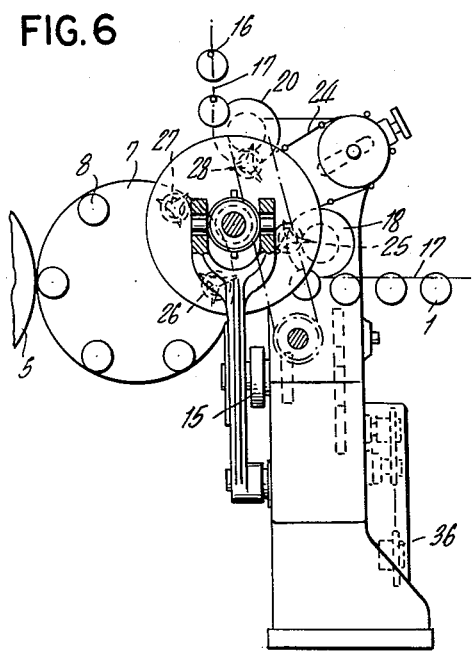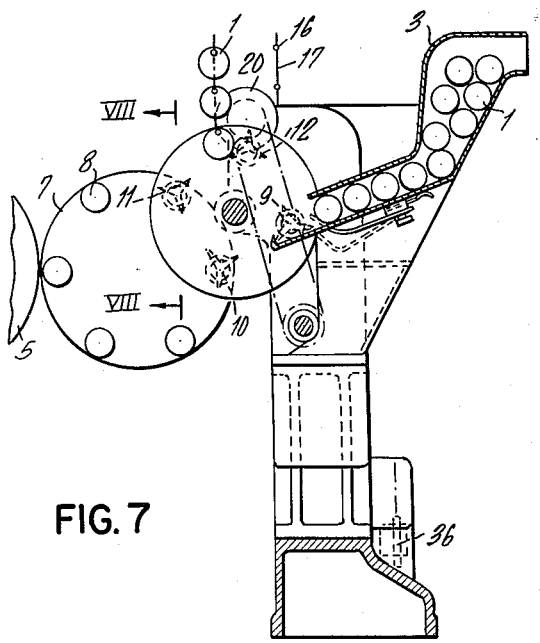

United States Patent Office 2,950,805
Patented Aug. 30, 1960

2,950,805
ARTICLE CONVEYING AND TRANSFERRING MEANS

Paul Heimlicher and Friedrich Meierhofer, Bern, Switzerland, assignors to Maschinenfabrik Winkler, Fallert & Co. A.G., Bern, Switzerland Filed Nov. 15, 1954, Ser. No. 468,948

Claims priority, application Switzerland Nov. 14, 1953

1 Claim. (Cl. 198—25)

Hollow bodies, such as tins, tubes and the like, are before filling varnished and printed, revarnished and in some cases completed with closures or other arrangements. After varnishing the hollow bodies are dried, but only to such an extent that the varnish layer is still sticky or tacky, so as to be better prepared to take any printing colour. To this layer of varnish the printing is applied and, if required, varnished over again, whereupon the colour or varnish is completely dried, so that the article will be ready for packing or to be filled. From this sequence of operations it will be seen, that the surfaces to be varnished and printed on, usually the cylindrical or conical outer parts of the hollow tin and like bodies, may not from the moment of varnishing up to complete drying come in contact with any foreign matter which may smear the varnish or the print. In most cases the hollow bodies have therefore hitherto been placed by hand on mandrels of the varnishing and printing machine and removed by hand again. The transport to the drying ovens was effected either by placing the articles or bodies on boards provided with nails or by chains provided with projecting bars and the speed of which was regulated more or less accurately to suit the handling capacity of the varnishing and printing machines.

Attempts have also been made to carry out such transfer mechanically. Placing the articles or bodies on to the varnishing machine could be done relatively simply, as no smearing was likely to occur there. The removal and the transfer to the printing machine has hitherto not been possible without manual aid. In order to be able to carry out the fully automatic transfer to both or even further machines (finishing machines) positively, accurate synchronisation of varnishing machines, printing machine, finishing machine, transferring devices and transporting is necessary. If such a synchronisation be lacking or should it not be positive, there will always be one body too many or too few for the transfer, unless a magazine be interposed. Magazines which do not smear the moist varnish and impression, however, have not yet been known.

The invention renders the possibility of establishing a plant for fully automatic varnishing, printing and finishing operations for said bodies, thus making same ready for packing or filling, of cylindrical or conical hollow bodies. The invention is characterised in that the prefabricated hollow bodies are conveyed by means of conveyer chains to varnishing machines, thereafter to printing machines, finishing machines, feeding, transferring and delivering or doffing means or devices, all of which are driven synchronously in a positive manner from at least one central power supply source.

A constructional example of the invention is illustrated in the accompanying drawings, in which:

Figs. 1 and 1A show a plant according to the invention, shown in elevation,

Figs. 2 and 2A are plan views of Figs. 1 and 1A, respectively,

Fig. 3 is a side elevation of feeding, transferring and doffing device,

Fig. 4 is a fragmentary side elevation of Fig. 3, the device being shown in the operative position of transfer from chain to chain;

Fig. 5 is fragmentary side elevation of Fig. 3, the device being in the operative position of transfer from chain to revolver plate, Fig. 6 is a vertical section taken on line VI—VI of Fig. 3 and Fig. 7 is a schematic sectional view taken on line VII—VII of Fig. 5, Fig. 8 is a cut-away portion taken on line VIII—VIII of Fig. 7, the tongs closed, and Fig. 9 is similar to Fig. 8 with the tongs opened.

In coming from the manufacturing machines the hollow bodies 1 are fed, for instance, via the conveyor belt 2 to the magazine 3 (Figs. 1 and 7). On the base 4 is mounted the varnishing machine 5 consisting of a varnish container which cooperates with a roll provided with ducts for passage of the lacquer or varnish from said varnish container to the roll. There is further provided a cylinder or roller which may be made from rubber or the like and is utilized for the transmission and distributing of the varnish or lacquer onto the hollow bodies or containers 1, which thereafter are placed onto mandrels 8. The varnishing machine may be independently driven from the remainder of the system by a motor 6. On the same base 4 is supported the revolver plate 7 with the mandrels 8, on to which the hollow bodies 1 are placed for varnishing. The hollow bodies are placed in position by tongs 9–12, Fig. 7, which are fixed on the rotatable support or plate 13, to which a step by step rotary motion is imparted by the Geneva indexing mechanism 14. The tongs 9–12 are moved forward and backward along their longitudinal axis, opening and closing of the tongs at the same time being controlled by cams 15 and 15a (see Figs. 8 and 9). The tongs 9 to 12 each include tong members 110 and 111 pivoted as 112 and 113 to mounting member 114. The tong members are provided with cylindrical heads 115 and 116 which members ride between collars 117 and 118 of a pin 119 which has another collar 120 which is urged by a spring 121 so that the end of the pin 122 is urged against the cam 15a. The tongs are held by an adapter 123 to the plate 13. In Fig. 9 there is shown the tongs 25 to 28 each of which include tong members 130 and 130a pivotally mounted as 131 and 132 and provided with spherical heads 133 and 134. The spherical heads 133 and 134 ride between collars 136 and 137 of a pin 138 which is spring pressed by spring 39 engaging the collar 140 so as to urge the end of the pin 141 against the cam 15a. The adapter 144 is provided for mounting the tong on plate 13. In operation, the cam moves the pins of all the tong members as sequentially necessary to move the collars which cause the tong members to open and close. The longitudinal axis of the tong means 9 to 12 is indicated at 150. The longitudinal axis of the tongs 25 to 28 is indicated at 160. During one step of the plate 13 the tongs 9 grip the nearest hollow body lying nearest in the magazine 3 and draw it out of the magazine 3. The tongs 10 place the hollow body gripped in the previous operational step on to one of the mandrels 8 and releases it. The tongs 11 seize the varnished hollow body coming from one of the mandrels 8 and draw it off the mandrel. The tongs 12 place the hollow body drawn off one of the mandrels 8 in the preceding operational step on to a projecting rod 16 of the transporting chain 17 and thereupon releases it. The transporting chain runs over rollers 18 and compensating roller 19, driven by sprocket wheels 20, through the drying oven 21. In a similar manner as above in the case of the varnishing machine the hollow bodies 1, after leaving the drying oven 21, are placed on the mandrels 22 of the printing machine 23 and, after being printed on, removed again from these mandrels and placed again on to the projecting rods 16, for instance of the same chain 17 or another chain. Owing to the detour 24 of the chain 17, the spacing of the projecting rods 16 may be different from the spacing of the tongs 25–28.

The printing machine 23 with the revolver rotating support or plate 29 rests on the base 30, in which the individual drive 31 of the printing machine 23 is housed. After the printed hollow bodies 1 have been placed in position they travel through the drying oven 32 to the place of delivery 33, where, for instance by being blown at with air through the nozzle 34, they are deposited on the conveyer band 35 (Fig. 2). At any place between the magazine 3 and the delivery or discharge place 33 finishing machines (not shown), for instance for the mounting of closures, may be provided, where with similar tongs as those for the printing or varnishing machine the hollow bodies are delivered, removed again and placed on to the same or another chain. As seen in Fig. 5 rotatable plate or support means 13 for the tongs 9–12 and the rotatable plate or support means 7 for the mandrels 8 form a composite or unitary structure at the respective treatment machine or station 5, 23, etc.

The main power supply is obtained from a variable speed motor 38 which through a gearing system 39, 40 rotates shaft 37 at the required speed. A chain or belt 36 transmits power from shaft 37 to a gear train consisting of gears 43, 44, 45, 46 located in the housing which supports the rotating plate 13. A rotatable plate 15, which is actuated by gear 46, is provided with and carries a crankpin 47 (Fig. 4) on which is mounted a sliding or gliding block 48, the latter being slidably supported in a slot 49 formed in the oscillating rod 50. As a result of the rotation of the rotatable plate 15 by gear 46 the rod 50 which is in association with the plate 13 is slowly oscillated back and forth, whereby the tongs 9–12 and 25–28 (Figs. 2, 3, 5) carried by the rotatable plate 13 are brought into and out of engagement with the cam plate 15a in order to open and close said tongs. The indexing or step by step movement of the plate 13 which carries the tongs is derived by means of gear 44 which rotates a bevel gear 51 (Fig. 4) which actuates a Geneva mechanism 14, the construction of which is known, through gears 52, 53.

The Geneva mechanism indexes the plate 13 and the tongs which are carried thereon through turning of shaft 56. The rotation of the cam 15a is in timed relation with the movement of the indexing mechanism 14 and the rod 50. The cam rotation being effectuated by gears 53, drum gear 54 and gear 55 which rotates the cam 15a.

The varnishing machine 5, the printing machine 23, the finishing machines (not shown), the conveying chain 17, the Geneva mechanism 14, the cam discs 15a are all positively coupled by way of driving gear 36a with the longitudinal shaft 37. The central drive or prime mover 38 drives by way of gearing 39, 40 the longitudinal shaft 37 and through it all the machines coupled to it and the other arrangements. Through the utilization of a variable-speed motor 38 the whole printing line can be adapted to the rate of feed of the conveyer band 2. The magazine 3 acts as a cushion and equalizes small speed differences. The speed can be automatically controlled in a known manner in dependance on the number of tin cans or like bodies to be treated which are contained in the magazine. The varnishing machine 5, the printing machine 22 and the not illustrated finishing machines can be detached by means of the coupling 41 from the common longitudinal shaft 37 and be driven independently with the individual motors 6 or 31 for the purpose of adjustment. Checking apparatus 42 indicate the absence of hollow bodies on the projecting rods 16, whereby a signal can be given and the installation can be put out of operation.

Various changes and modifications may be made without departing from the spirit and scope of the present invention and it is intended that such obvious changes and modifications be embraced by the annexed claim.

Having thus described the invention, what is claimed as new and desired to be secured by Letters Patent is:

A system for automatically conveying hollow containers undergoing a series of operations to and from a plurality of treatment stations; comprising first rotatable support means, tong means having a longitudinal axis carried by said first rotatable support means, cam means in engagement with said tong means to open and close said tong means in accordance with the operation to be performed upon said containers, said tong means when in closed position being capable of grasping and holding said containers, said tong means in said open position being capable of releasing said containers, second rotatable support means located adjacent said first rotatable support means, mandrel means carried by said second rotatable support means, said cam means being further operatively connected to said tong means to displace the latter along the longitudinal axis thereof, drive means for imparting movement to and cooperable with said first and second rotatable support means and said cam means for opening and closing said tong means, and a Geneva indexing means connected between said drive means and said first and second rotatable support means and said cam means, so that said second support means and said mandrel means and said tong means move intermittently in step-by-step timed relation with each other to thereby permit said containers when held by said tong means to be placed onto said mandrel means for conveying said containers to a selected treatment station.

References Cited in the file of this patent

UNITED STATES PATENTS

| | | |
|---|---|---|
| 920,870 | Hodgman | May 4, 1909 |
| 1,461,761 | Paull et al. | July 17, 1923 |
| 1,947,171 | Prussing | Feb. 13, 1934 |
| 2,288,617 | Friden | July 7, 1942 |
| 2,420,620 | Remington et al. | May 13, 1947 |
| 2,526,712 | Thompson | Oct. 24, 1950 |
| 2,651,283 | Zinn | Sept. 8, 1953 |
| 2,738,819 | De Back | Mar. 20, 1956 |